United States Patent
Mangalam-Palli et al.

(10) Patent No.: US 10,409,962 B2
(45) Date of Patent: Sep. 10, 2019

(54) SYSTEM AND METHOD FOR CONTROLLING ACCESS TO PROTECTED CONTENT

(75) Inventors: Jayant Mangalam-Palli, Portland, OR (US); Rajesh Banginwar, Bangalore (IN); Venkat Gokulrangan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/129,381

(22) PCT Filed: Oct. 28, 2011

(86) PCT No.: PCT/US2011/058196
§ 371 (c)(1),
(2), (4) Date: Feb. 18, 2014

(87) PCT Pub. No.: WO2013/002821
PCT Pub. Date: Jan. 3, 2013

(65) Prior Publication Data
US 2014/0196159 A1    Jul. 10, 2014

(30) Foreign Application Priority Data
Jun. 30, 2011   (IN) .......................... 1859/DEL/2011

(51) Int. Cl.
*G06F 21/10*    (2013.01)
*G06F 21/72*    (2013.01)
(Continued)

(52) U.S. Cl.
CPC .............. *G06F 21/10* (2013.01); *G06F 21/72* (2013.01); *G06F 21/85* (2013.01);
(Continued)

(58) Field of Classification Search
USPC .......... 726/30, 2, 21, 36; 713/150, 163, 181; 380/255, 264, 276
See application file for complete search history.

(56) References Cited

U.S. PATENT DOCUMENTS 6,550,011 B1 *   4/2003   Sims, III ................ G06F 21/10
                                                          365/52
6,574,609 B1     6/2003   Downs et al.
(Continued)

FOREIGN PATENT DOCUMENTS

| JP | 2001-51960 | 2/2001 |
|----|------------|--------|
| JP | 2008-5168  | 1/2008 |

(Continued)

OTHER PUBLICATIONS

Office Action received for Taiwan Patent Application No. 101115587, dated Jul. 17, 2014, 17 pages of Office Action including 8 pages of English Translation.
(Continued)

*Primary Examiner* — Sharif E Ullah
(74) *Attorney, Agent, or Firm* — Schwabe, Williamson & Wyatt, P.C.

(57) ABSTRACT

A receiver includes a first interface to receive content, a second interface to be coupled to a device, and a processor to determine whether the device is a compliant device and to prevent decryption of at least a portion of the content received through the first interface when the device is determined to be a non-compliant device.

25 Claims, 8 Drawing Sheets

(51) Int. Cl.
*G06F 21/85* (2013.01)
*H04N 21/41* (2011.01)
*H04N 21/4402* (2011.01)
*H04N 21/4405* (2011.01)
*H04N 21/442* (2011.01)
*H04L 29/06* (2006.01)

(52) U.S. Cl.
CPC ..... *H04N 21/4104* (2013.01); *H04N 21/4402* (2013.01); *H04N 21/4405* (2013.01); *H04N 21/44231* (2013.01); *H04L 63/1441* (2013.01); *H04L 65/4084* (2013.01); *H04L 2463/102* (2013.01)

(56) References Cited

U.S. PATENT DOCUMENTS

| | | | | |
|---|---|---|---|---|
| 7,889,863 | B2* | 2/2011 | Harada | G11B 20/00086 380/201 |
| 7,895,442 | B1* | 2/2011 | Adams | G06F 21/10 380/201 |
| 8,265,776 | B2* | 9/2012 | Osann, Jr. | G05B 15/02 700/22 |
| 9,736,524 | B2* | 8/2017 | Aravamudan | H04N 21/41407 |
| 2002/0107803 | A1* | 8/2002 | Lisanke | G06F 21/10 705/51 |
| 2003/0040962 | A1* | 2/2003 | Lewis | G06Q 30/0225 725/32 |
| 2003/0221167 | A1* | 11/2003 | Goldstein | G06F 16/9577 715/234 |
| 2004/0133793 | A1* | 7/2004 | Ginter | G06F 21/10 713/193 |
| 2005/0044016 | A1 | 2/2005 | Irwin et al. | |
| 2005/0228995 | A1 | 10/2005 | Kwak et al. | |
| 2007/0124602 | A1 | 5/2007 | Wald et al. | |
| 2008/0288410 | A1 | 11/2008 | Nino | |
| 2011/0055901 | A1* | 3/2011 | Karaoguz | G06F 21/10 726/4 |
| 2011/0221388 | A1* | 9/2011 | Low | H02J 5/005 320/108 |
| 2012/0176509 | A1* | 7/2012 | Aravamudan | H04N 21/41407 348/231.3 |

FOREIGN PATENT DOCUMENTS

| | | |
|---|---|---|
| JP | 2011-8565 | 1/2011 |
| KR | 2005-0098515 | 10/2005 |
| WO | WO 2006/038622 | 4/2006 |
| WO | 2013/002821 A1 | 1/2013 |

OTHER PUBLICATIONS

Office Action received for German Patent Application No. 112011105393.2, dated Feb. 3, 2014, 1 page.
International Preliminary Report on Patentability and Written Opinion received for PCT Patent Application No. PCT/US2011/058196, dated Jan. 16, 2014, 6 pages.
International Search Report and Written Opinion dated May 4, 2012 for corresponding Application No. PCT/US2011/058196.
Japanese Office Action for Application No. 2014-516962 dated Feb. 17, 2015 and English language translation.
Korean Office Action for Application 10-2013-7034650 dated Apr. 28, 2015 and English Translation.
English translation of Notice of Dismissal of Amendment dated Dec. 29, 2015.
Korean Office Action issued in Application 2015-7017069 dated Dec. 20, 2016 (full Korean text and full English translation).
Office Action dated Jun. 28, 2017 for Korean Patent Application No. 2015-7017069, 8 pages.

* cited by examiner

SYSTEM AND METHOD FOR CONTROLLING ACCESS TO PROTECTED CONTENT

The present application is a U.S. National Stage of PCT/US2011/058196, filed Oct. 28, 2011, which claims priority from Indian Patent Applications 1859/DEL/2011, filed Jun. 30, 2011, the subject matters of which are incorporated herein by reference.

FIELD

One or more embodiments described herein relate to content protection.

BACKGROUND

Various forms of digital and multimedia content can only be accessed by authorized (or so-called compliant) devices. When authorized, decryption techniques are used to give users access on a temporary or permanent basis. However, when a device cannot be authenticated, access is blocked in order to protect the copyright of the content provider. In spite of on-going efforts to develop more sophisticated security schemes, backdoor or unforeseen loopholes exist that allow protected content to be illegally accessed.

DETAILED DESCRIPTION

Figure 1:
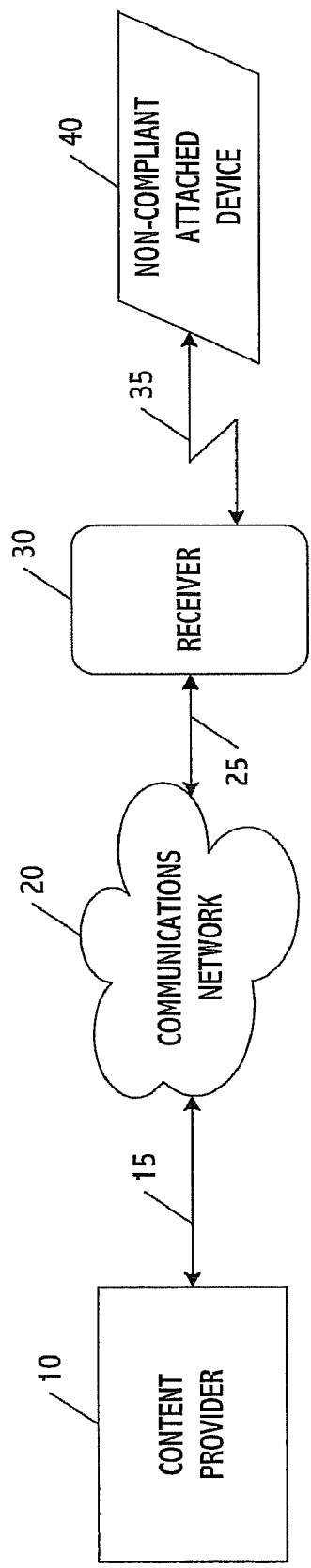
FIG. 1 shows an example of a system for downloading protected content.

FIG. 1 shows an example of a system for downloading content. The system includes a content provider 10, a communications network 20, a receiver 30, and a non-compliant device 40 in communication with the receiver.

The content provider 10 may provide any type of content including data subject to copyright protection and/or information that conforms to a specific type of format. One type of content includes data subject to high-bandwidth digital copyright protection (HDCP). This data may include pre-recorded or live music, image files, video files, chat and/or video conferencing images, games, digital documents, electronic books, ring tones, podcasts, applications, or other types of programs or digital content.

The video files may be broadcast, cable, or satellite television programs, Moving Picture Expert Group (MPEG) files, AVI files, Flash files, or files that conform to other types of formats including but not limited to High-Definition Multimedia Interface (HDMI), Digital Visual Interface (DVI), or other high-definition or video formats. The audio files may be Moving Picture Experts Group Layer-III (MP3) files, Windows Wave (.Wav) files, or ones that conform to other audio file formats.

The data from the content provider may be made available for download for a one-time price or subscription fee, but payment is not necessarily required. Also, in other embodiments, the data may be subject to forms of content protection different from HDCP including but not limited to Digital Transmission Content Protection (DTCP), Content Protection for Recordable Media (CPRM), Content Protection for Pre-Recorded Media (CPPM), Conditional Access (CA) technologies, Content Scramble System (CSS), and Digital Rights Management (DRM).

In order to protect the content, the content provider may include or have access to various types of encryption software. This software may encrypt content based on various digital certificates, public, and/or private keys that conform to or otherwise correspond to the formats and file types mentioned herein.

The content provider may include or otherwise be coupled to a transmitter for transmitting the protected content through the network after encryption and authentication has taken place. According to one example, the transmitter may be an HDCP/HDMI interface for transmitting video content to a mobile phone.

The communications network 20 may be any type of network including the Internet, a mobile communications network, a satellite network or a combination thereof. The type of connection 15 to the content provider may depend on the type of network. For example, if the network is the Internet, connection 15 may be a wireless connection or a hardwired connection such as but not limited to a cable or fiber-optic connection. Alternatively, the connection may be a wireless connection if the network is a satellite or mobile network.

The receiver 30 may be user terminal such as a mobile phone, smart phone, personal digital assistant, handheld computer, mobile tablet or pad, notebook or desktop computer, digital video recorder (DVR), or any other electronic device equipped with communication capability for receiving downloaded information. In other embodiments, the receiver may be a set-top box from a cable or satellite company, which box is coupled to a monitor, television, projector, speakers or other device for outputting the downloaded content. In other embodiments, the receiver may be any one of a number of commercially available game consoles. The connection 25 to the communication network may be any of the same types that correspond to connection 15.

The non-compliant device 40 is a device having a data storage capability and/or an ability to display, output, or otherwise reproduce the protected content transmitted to the receiver from the content provider. Device 40 is unauthorized in the sense that it is one which has not been authenticated for access to receive the protected content transmitted to the receiver. As will be explained in greater detail below, the user of this device may therefore be able to view, use, or otherwise obtain access to the protected content in violation of copyright or other protection laws.

Examples of the non-compliant device include an external display device, a flash memory drive, hard-disk drive, digital video recorder (when, for example, the user terminal is a set-top box coupled to a television), a mobile terminal (e.g., phone, smart phone, PDA, iPod, iPhone, etc.), or a notebook or other type of computer.

The non-compliant device 40 may be coupled to the receiver through connection 35, which may be a short-range wireless connection such as a wireless fidelity (WiFi), Bluetooth, or wireless local area network (WLAN) link, removable or local interface connections such as a Universal Serial Bus (USB) or Firewire interface, Serial Advanced Technology Attachment (SATA) interface, a high-definition cable such as an HDMI cable, or any one of a number of other types of serial or parallel data connections.

In some systems, a content receiver such as a user terminal may continue to decrypt protected content when an unauthorized (non-compliant) device is attached to the terminal after the user terminal has been authenticated (determined to be compliant) by the content provider/transmitter and/or the receiver and after the content provider (or other content source) and/or the receiver has begun to encrypt and/or transmit the protected content. This situation may allow the attached device to access the protected content through connection 35 in spite of is non-compliant status, which would amount to theft of the copyrighted or protected material.

This loophole may also potentially allow a display driver of the user terminal (e.g., one residing in the operating system (OS) space) to be used by the attached device to display the content that it illegally acquired. For example, if the authorized device is a flash memory, a display driver of the terminal may be used to display the protected content stored in the flash memory.

In accordance with one or more embodiments described herein, unauthorized access and/or display of the protected content by the attached device may be prevented using a technique which has the receiver detect attachment of the unauthorized device as a condition to decrypting (or as a condition to continuing to decrypt) the content.

Figure 2:
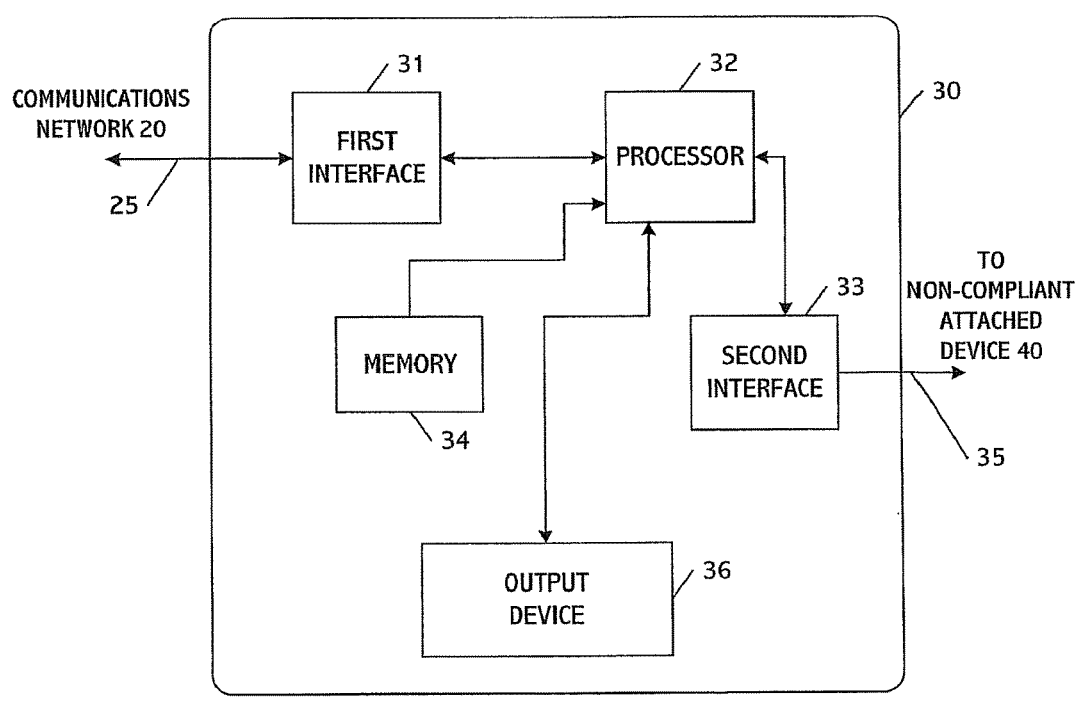
FIG. 2 shows one embodiment of a receiver of protected content.
Figure 3:
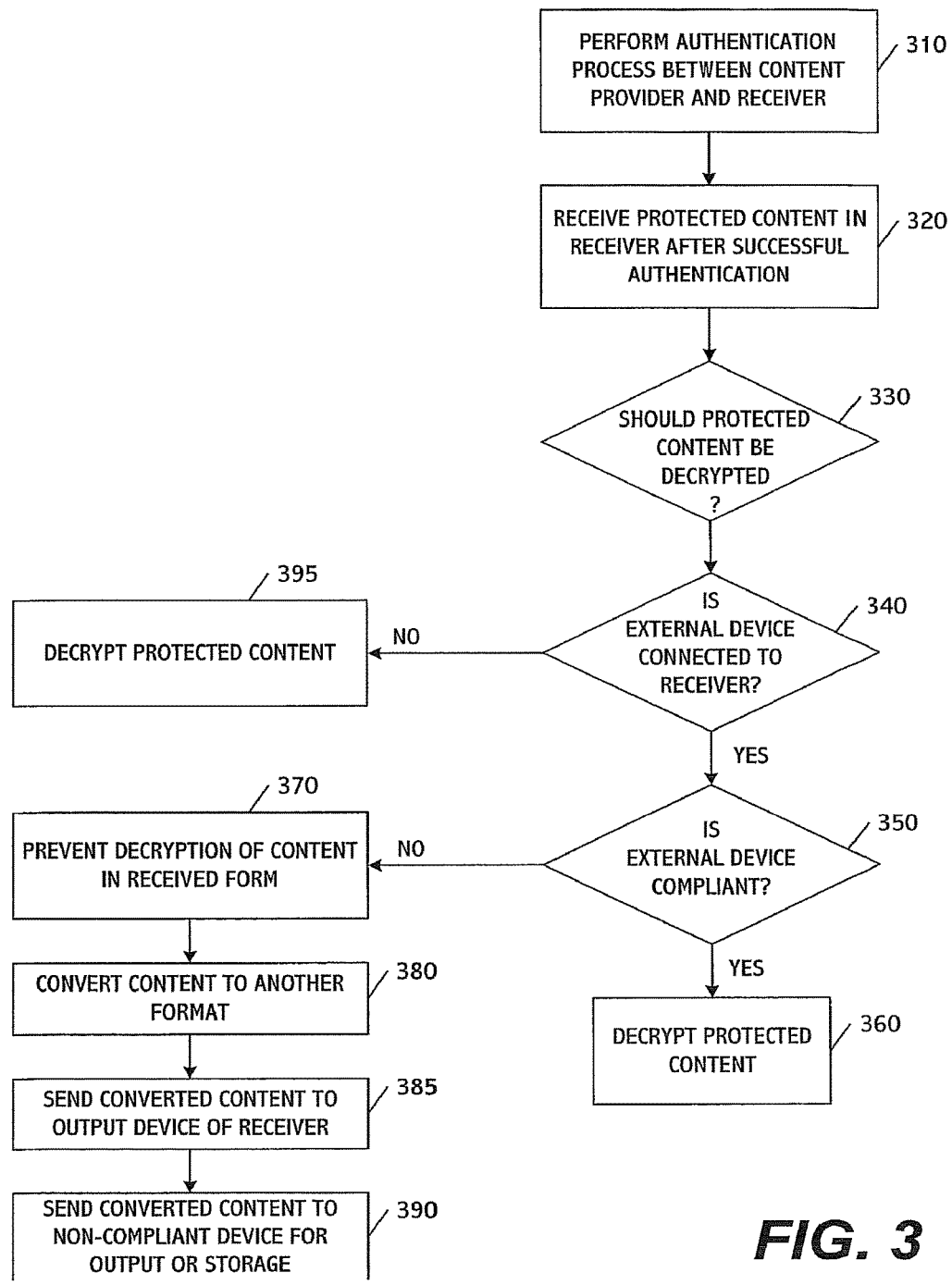
FIG. 3 shows a method for controlling access to protected content.

FIG. 2 shows one embodiment of a receiver 30 that is equipped to implement the aforementioned technique. The receiver includes a first interface 31, a processor 32, a second interface 33, and memory 34, and an output device 36. These elements may implement one embodiment of a method for controlling access to protected content. Operations of this method are shown in FIG. 3 to be described with the receiver elements. While the receiver of FIG. 2 is suitable to implement this method, a different type of receiver may be used in other embodiments.

The first interface 31 is compatible with the format of the data to be received from the content provider and the network to which the receiver is coupled. According to one example, the first interface may be HDCP/HDMI compatible as is the transmitter in or coupled to the content provider used to transmit protected content. In this case, connection 25 may be an HDMI cable.

The processor 32 performs various operations including exchanging signals with the content provider during an authentication process and controlling receipt and decryption of the protected content after authentication and detection of the non-compliant status of device 40. The processor may logic to perform these and other functions to be discussed. This logic may be implemented in hardware, software, or a combination.

The authentication process may involve, for example, performance of a handshake sequence with the content provider. (Block 310). This handshake sequence may be accomplished in several ways. One example is to perform a SIGMA session establishment. Another way involves exchanging certificates if provision is made for a pre-shared secret key or pre-established public/private key exchange between the service provider and receiver device.

After the receiver has been authenticated, the content provider begins to encrypt and transmit and the receiver begins to receive the protected content. The protected content may be sent to the receiver, for example, in response to a request for the content from the receiver to the content provider. This may occur, for example, when a request sends a request to the content provider to download a movie, video clip, music file, application, or other form of content. Additionally, or alternatively, the content may be scheduled to be automatically sent from the content provider to the receiver (e.g., in the case of a subscription or Really Simple Syndication (RSS) feed), or sent based on the occurrence of a predetermined event in the receiver or according to a pre-programmed schedule (e.g., a record operation initiated using an electronic program guide). Other examples may also apply.

After or during encryption, the receiver begins to receive the protected content. (Block 320). A decision is then made as to whether the protected content should be decrypted. (Block 330). In accordance with one embodiment, this decision is based on whether an external device 40 has been connected (e.g., either physically or through a wireless link) to second interface 33 shortly before or after decryption of the protected content has begun (Block 340) and whether the external device is detected to be a compliant device (Block 350).

In accordance one embodiment, a compliant device may be one that has been authorized to receive copyright or other protected data (e.g., one that has a license to receive this data), one that is capable of reproducing the data in a specific format (e.g., high-definition format), or both. Compliance may be determined based on different criteria in other embodiments, e.g., whether the data is in a different format or is subject to a type of protection different from HDCP.

If the device is detected to be a compliant device, the processor allows decryption of the protected content to begin. (Block 360). The decrypted content may be stored in memory 34 to be output on output device 36, either immediately such as in the case of streaming content or at some later time which may either be predetermined or in response to a user command. The output device may be any device capable of outputting or otherwise reproducing the decrypted content, including a display, speakers, or another type of device as previously indicated.

If the device is detected to be a non-compliant device, the processor will prevent the decryption process from being performed. (Block 370). As indicated, in accordance with one embodiment, a device may be determined to be non-compliant if it is non-HDCP compliant and/or non-HDMI compliant. The former instance may exist, for example, when external device does not have a license to receive the protected content. The latter instance may exist, for example, when external device 40 is unable to display high-definition content. Of course, both instances may exist simultaneously, i.e., external device 40 may be a non-HDCP and non-HDMI compliant device.

Preventing decryption will prevent the content from being output to the user of the receiver. To prevent this situation from happening and, at the same time, prevent the non-compliant device from receiving the protected content, several optional operations may be performed after decryption has been prevented or terminated.

For example, if the protected content is received in one (e.g., high-definition) format, the processor may convert the content into another (e.g., lower-resolution) format that does not require decryption. (Block 380). The content in the converted format may then be send to the output device 36 for presentation to the user with or without it first being stored in memory. (Block 385). This conversion alleviates the need to perform decryption and allows the user to access all or a portion of the content, albeit in a different form or format. At the same time, all or a portion of the converted content may be allowed to be transferred to or otherwise stored in the non-compliant device in the unprotected or converted (e.g., compatible) form or format. (Block 390).

If a conversion to a lower-resolution or different format is not possible, the processor may prevent any version of the data from being transmitted to the non-compliant device.

If an external device is not detected to be connected to the receiver in Block 340, then the protected content is decrypted, stored in memory, and/or sent to the output device for presentation to the user. (Block 395). The output device is shown as being included in the receiver of FIG. 2. In other embodiments, the output device may be an external unit coupled to the receiver through an appropriate link or interface.

Figure 4:
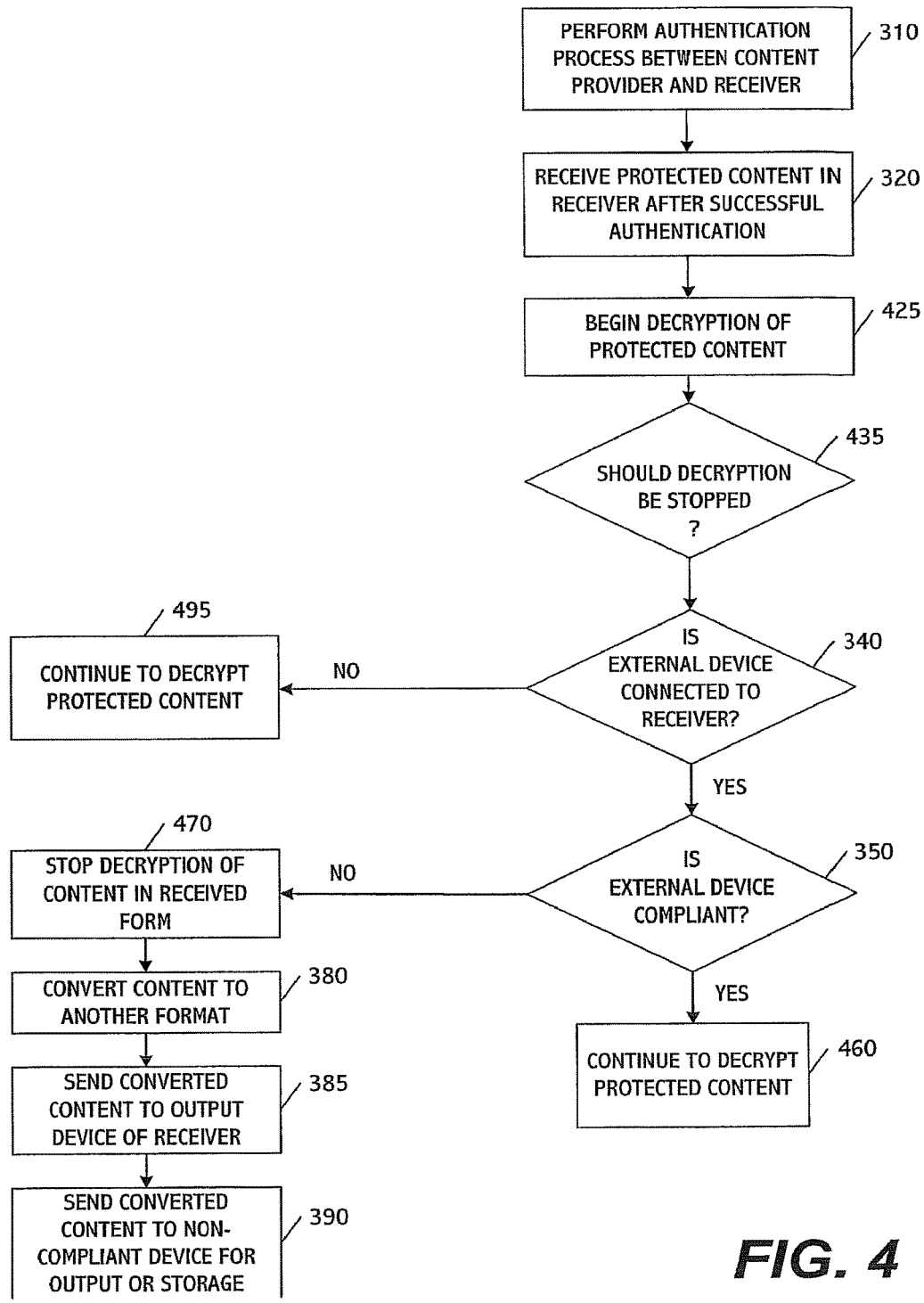
FIG. 4 shows another method for controlling access to protected content.

FIG. 4 shows operations in another embodiment of a method for controlling access to protected content. This embodiment is similar to the embodiment of FIG. 3 except that steps are taken to prevent the non-compliant device from accessing, or fully accessing, the protected content after decryption has already begun.

According to this alternative method, decryption of the protected content begins (Block 425). Then, a determination is made as to whether the decryption process should be stopped. (Block 435). Decryption will continue if an external device is detected to be connected to the receiver and the external device is determined to be compliant (Block 460), or will continue if an external device is not detected to be connected to the receiver (Block 495).

The decryption process will be stopped by the processor if an external device is detected to be connected to the receiver and the external device is determined to be a non-compliant device. (Block 470). In this case, the entire process may be terminated or the operations in optional Blocks 380, 385, and 390 may be performed.

Figure 5:
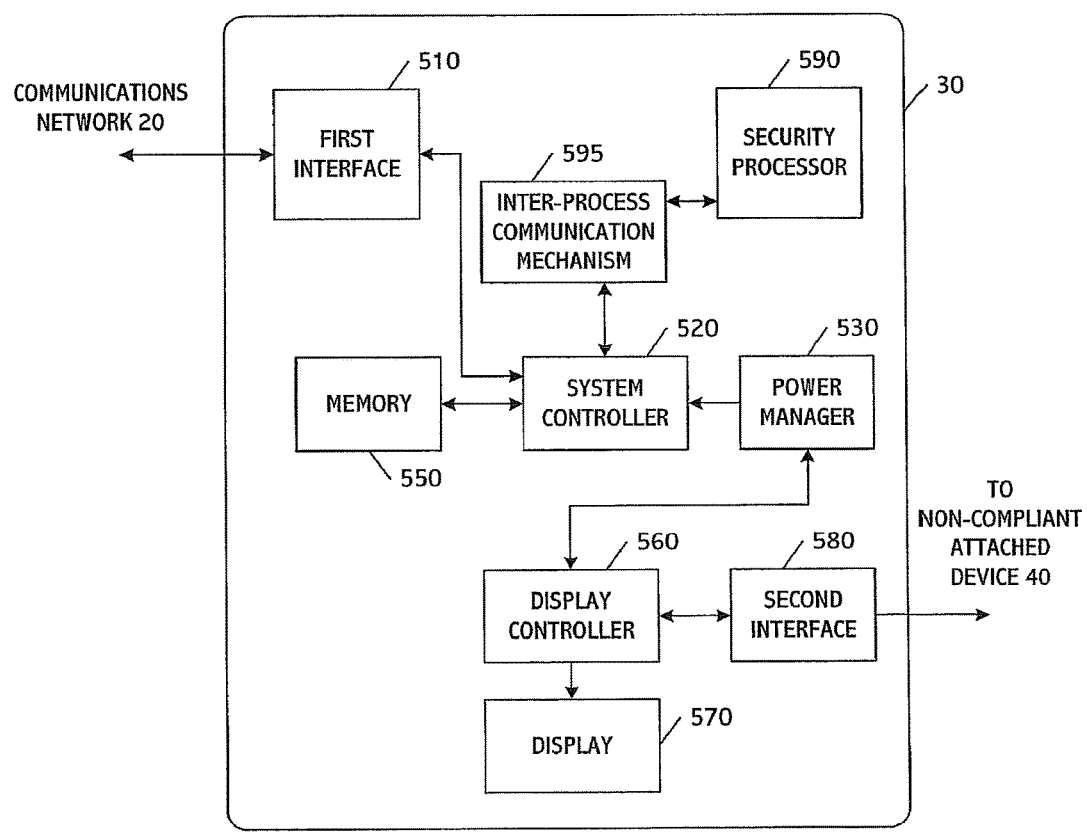
FIG. 5 shows another embodiment of a receiver of protected content.

FIG. 5 shows another embodiment of a receiver that may be included in the system of FIG. 1. This receiver includes a first interface 510, a system controller 520, a power manager 530, a security processor 540, and a memory 550. The first interface may be coupled to the communications network 20 to receive protected content, and the system controller may control storage of the protected content in memory and/or may send a control signal to a display controller 560 for outputting the protected content on a display 570. Although the display is shown as being an internal display, in different embodiments the display controller may be coupled to an external display or other device for outputting the protected content.

The display controller is coupled to a second interface 580 for communicating with external device 40. The display controller may detect whether device 40 is a compliant device and then send a control signal to a power manager 530 indicating the same. Based on this control signal, the power manager sends information to a security processor 590, which controls decryption of the protected content received through the first interface. The system controller may communication with the security processor, for example, through an inter-process communication (IPC) mechanism 595.

By way of example, the power manager may be included in the North Complex or Bridge of some device architectures and the system controller may be included in the South Complex or Bridge of those architectures.

Figure 6:
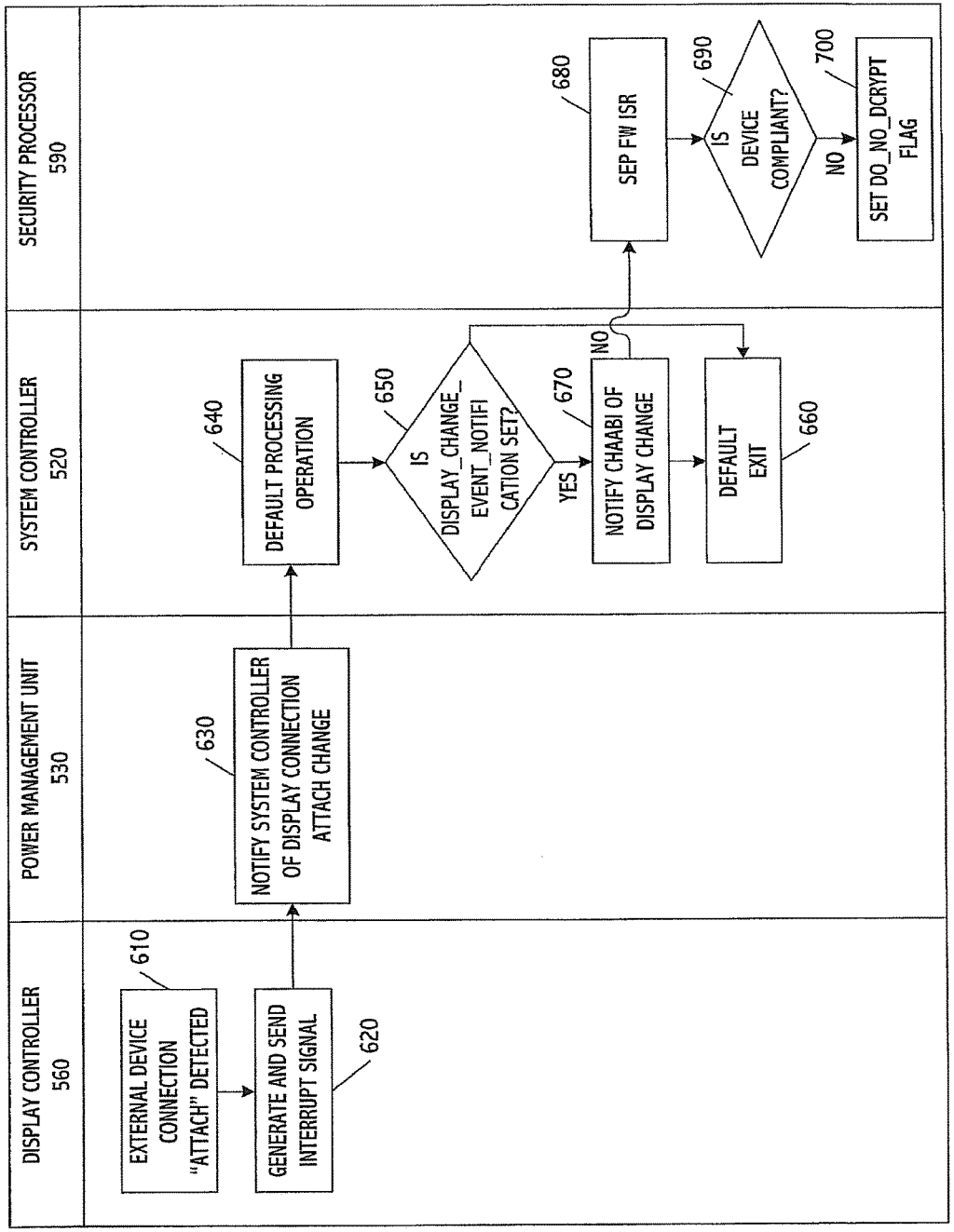
FIG. 6 shows another method for controlling access to protected content.

FIG. 6 shows operations included in another embodiment of a method for controlling access to protected content. This method may be performed by the receiver of FIG. 5 or another device. An initial operation includes detecting a connection of external device 40 to the second interface 580 of the receiver. (Block 610). This detection operation may be performed by the display controller based on, for example, on use of a display enable interrupt mechanism in the power unit. As previously indicated, the connection between the external device and receiver may be any one of a number of wired or wireless connections.

Once a connection to the external device is detected, the display controller 560 may generate and send an interrupt signal to the power manager 530. (Block 620). The interrupt signal may be, for example, in the form of a hotplug event interrupt. In response to the interrupt signal, the power manager generates a notification signal to inform the system controller 520 that an external device has been connected to the second interface. (Block 630).

The system controller performs a predetermined processing operation in response to the attach notification signal. (Block 640). This operation includes determining whether a display change event notification has been set or otherwise indicated. (Block 650). According to one scheme, a security engine may choose to ignore such interrupt notification, for example, when not in protected-content playback mode. When this occurs, a flag can be set to prevent the system control unit (SCU) from receiving the interrupt notification. Alternatively, all such interrupts can be forwarded to the security engine for processing to take place. During processing, the security engine (e.g., security processor 590) may choose to do nothing in the example mentioned above.

If a display change event notification is not detected, then the system controller continues to perform, for example, operations based on user interaction or ones being performed before the attachment was detected. (Block 660).

If a display change event notification is detected, the system controller sends a notification signal to the security processor 590 indicating the same. (Block 670). The notification signal may be sent to the security processor through IPC 595 or along another path. Once received, the security processor performs interrupt processing in an interrupt service routine. (Block 680).

A determination is then made as to whether external device 40 is a compliant device. (Block 690). This may involve, for example, determining whether device 40 is HDCP compliant, HDMI compliant, or both. This determination may be made based on, for example, information included in the notification signal set to the security processor from the system controller. Alternatively, the compliance determination may be made based on signals sent through an established mailbox mechanism between the system controller and security processor.

According to another example, the security processor may determine whether device 40 is an HDCP-compliant device by using a mailbox form of communication between the security processor, system controller, and power manager. According to this approach, the security processor sends an interrupt to the system controller after requesting this information using a predetermined protocol in the mailbox. The security processor may then format this information to the power manager or other power unit, which responds with appropriate compliance information back to the system controller, which then communicates this information to the security processor. For example, in the case where the attached device is an external display, the compliance information may be a type of the display, e.g., HD display or not.

Of course, compliance to formats or forms of protection other than HDMI and HDCP may be determined in other embodiments.

If the device is determined to be a non-compliant device, then the security processor may set a Do_Not_DCRYPT flag to cause the security processor either to prevent decryption of the protected content from being initiated or to stop decrypting the protected content if decryption has already begun. (Block 700). As a result, access to the protected content by the device 40 may be denied, thereby preventing theft or other forms of unauthorized access to the protected content.

After decryption is prevented or stopped, the content may be converted to a non-protected form of content (e.g., from HDMI to lower-resolution content), and this converted content may then be output on display 570 and transmitted to device 40 also for display and/or storage in a manner similar to one or more previously described embodiments. Alternatively, if such a conversion cannot be performed, the security processor may stop transmitting content to device 40 and/or prevent any further communication with this device.

Once set, the flag may be cleared in various ways. For example, the flag may be cleared when the display controller detects that device 40 has been disconnected from the receiver. In this case, the display controller may generate a signal to be received by the security processor for resetting the flag. Alternatively, the flag may be cleared when a compliant device is subsequently connected to the second interface of the receiver. Clearing the flag may also allow decrypting of the protected content to be completed for output on the display 570 to a user.

If the device is determined to be a compliant device, the flag is not set and decryption may be initiated or allowed to continue to be performed. The decrypted content may then be output on the display 570 for viewing by a user and may also be routed to the external device 40 which may also include a display for displaying the now-decrypted content. The content may, for example, be high-definition video or other content as described herein and may be stored in memory 550 in either encrypted or decrypted or otherwise converted form as described herein. The operations in FIG. 7 may optionally be preceded by or include an authentication process of the receiver as a condition to receiving the content.

Figure 7:
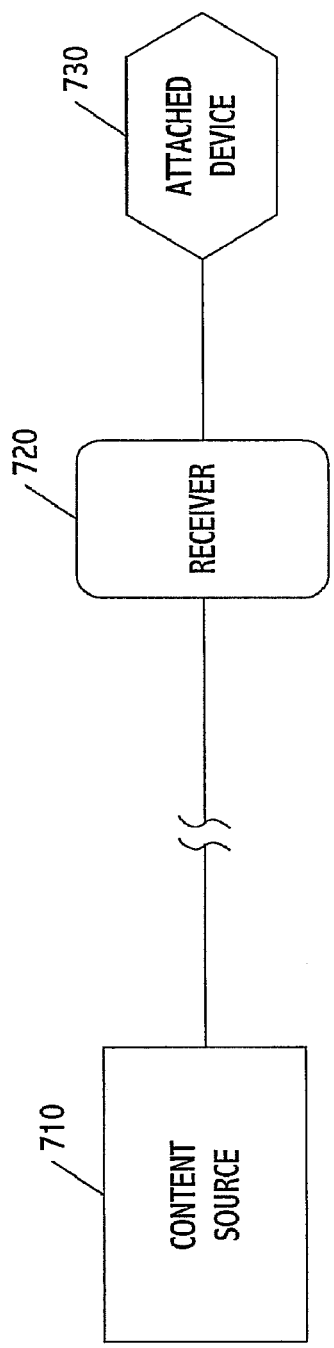
FIG. 7 shows another example of a system for downloading protected content.

FIG. 7 shows another embodiment of a system for downloading content. The system includes a content source 710, a receiver 720, and an external device 730 attached to the receiver. The content source may be a set-top box, a digital versatile disk (DVD) player, a high-definition or Blu-ray player, a digital video recorder, a computer game console or video card, a video camera or still camera, or another source of digital content. The receiver may correspond to and perform the functions of the receiver in accordance with any of the embodiments described herein, and the same is true of the attached device.

Figure 8:
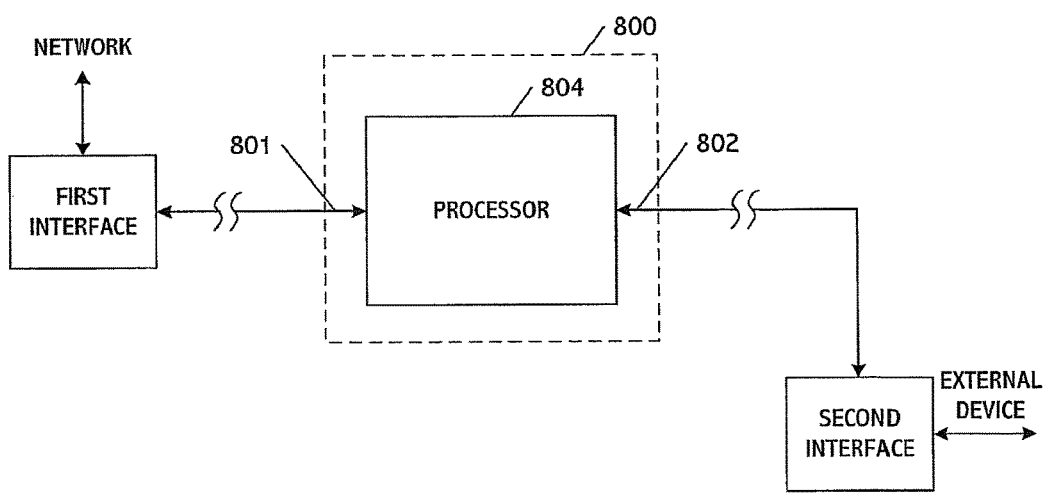
FIG. 8 shows an embodiment of a device to control decrypting of content.

FIG. 8 shows an embodiment of a device 800 to control decrypting of content. The device includes an input line 801 to receive a first signal on content received from a first interface, an input line 802 to receive a second signal indicative of a connection of an external device to a second interface 803; and a processor 804 coupled between the first interface and the second interface. The processor may correspond, for example, to processor 32 in the receiver of FIG. 2 or security processor 590 in the receiver of FIG. 5 or another processor.

In operation, the processor determines whether the external device is a non-compliant device after receipt of at least the second signal and prevents decryption of the content when the device is determined to be a non-compliant device. The first signal may include the content itself or a signal notifying the processor that content has been received. Furthermore, the processor may be a hardware circuit or may be a processor which executes a program to determine whether the external device is a non-compliant device or to prevent decryption of the content, or both. In another embodiment, the processor may be a combination of hardware or software.

In addition, while two input lines 801 and 802 are shown, a single input line may be used to receive the first and second signals. Moreover, the content may be subject to a type of digital copyright protection, and in this case the processor may determine that the device to be non-compliant with this type of digital copyright protection. Additionally, or alternatively, the content may be a high-definition video format, and in this case the processor may determine that the device is non-compliant with the high-definition video format.

In addition, the processor may prevent decryption of the content before any portion of the content is decrypted, or may prevent decryption of a second portion of the content after a first portion of the content is decrypted. In this latter case, the first portion of the content may be decrypted before the processor is to determine that the external device is a non-compliant device.

In addition, the input line to receive the first signal, the input line to receive the second signal, and the processor may all be located on a same chip. In this case, the input lines may be traces on the chip or different input ports or leads or even the same port or lead of the chip.

In accordance with another embodiment, a computer-readable medium may store a program for controlling a receiver. The program may be stored in memory 34 in FIG. 2, memory 550 in FIG. 5, or another memory including but not limited to an internal memory of any of the processors or controllers mentioned heretofore.

The program may include first code to detect connection of a device to the receiver, second code to determine the device to be a non-compliant device, and third code to prevent decryption of content received through an interface when the device is determined to be said non-compliant device. The content may be subject to a type of digital copyright protection, may be in a high-definition video format, or may be configured in accordance with any one of the other formats or protected forms described herein. The program may also include additional code for performing the other operations included the embodiments described herein.

In accordance with at least one embodiment, the decision as to whether or not to decrypt protected content is made by the security processor, which is considered to be one of the most trusted portions of the entire receiver and thus which provides an increased chance that no loophole can be exploited that could result in theft or other form of unauthorized access of protected content.

In accordance with at least one embodiment, the term "processor" may be considered to cover a single device or may generically be used to correspond to a combination of devices (e.g., display controller 560, power manager 530, security processor 590, etc.) that perform processing functions or other operations as described herein. Also, the term "coupling" may correspond to a direct wired or wireless connection, an indirect wired or wireless connection, or a combination thereof.

Any reference in this specification to an "embodiment" means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. The features of any one embodiment may be combined with features of one or more other embodiments described herein to form additional embodiments.

Furthermore, for ease of understanding, certain functional blocks may have been delineated as separate blocks; however, these separately delineated blocks should not necessarily be construed as being in the order in which they are discussed or otherwise presented herein. For example, some blocks may be able to be performed in an alternative ordering, simultaneously, etc.

Although the present invention has been described herein with reference to a number of illustrative embodiments, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

We claim:

1. An apparatus, comprising:
a first interface to receive content from a content provider;
a second interface to be wirelessly coupled to a device; and
a processor to decrypt a portion, but not all, of the received content prior to any of the received content provided to the device, the processor to determine whether the device is a compliant device after the decryption of the portion of the received content, and after wireless coupling of the device to the apparatus, but prior to any of the received content provided to the device,
the processor further to prevent further decryption of at least a portion of the content received through the first interface when the device is determined to be a non-compliant device,
wherein the content is one or more of audio files, image files, video or chat files, games, documents, texts or applications.

2. The apparatus of claim 1, wherein:
at least the portion of the content is subject to a type of digital copyright protection, and
the processor is to determine the device to be non-compliant with the type of digital copyright protection.

3. The apparatus of claim 1, wherein:
at least the portion of the content is in a high-definition video format, and
the processor is to determine the device is non-compliant with the high-definition video format.

4. The apparatus of claim 1, wherein:
the processor is to prevent decryption of a second portion of the content after a first portion of the content is decrypted at the apparatus and prior to any of the received content provided to the device, and the first portion of the content is decrypted before the processor is to determine that the device is a non-compliant device.

5. The apparatus of claim 1, further comprising:
a power manager coupled to the processor,
wherein the power manager is to send a signal to the processor indicative of the coupling of the device and wherein the processor is to determine that the device is a non-compliant device after receiving the signal from the power manager.

6. The apparatus of claim 1, further comprising:
a controller to detect the wireless coupling between the second interface and the device,
wherein the processor is to determine that the device is a non-compliant device after the controller is to detect the wireless coupling between the second interface and the non-compliant device.

7. The apparatus of claim 1, wherein the second interface is to be wirelessly coupled to the device over a wireless link.

8. The apparatus of claim 1, wherein the processor is to convert, at the apparatus, at least the portion of the content to a non-compliant format after the device is determined to be a non-compliant device, and wherein at least the portion of the content is to be produced through an output device in the non-compliant format.

9. The apparatus of claim 1, wherein the processor is to convert, at the apparatus, at least the portion of the content to a non-compliant format after the device is determined to be a non-compliant device, and wherein at least the portion of the content is to be sent to the non-compliant device through the second interface in the non-compliant format.

10. A method comprising:
receiving content through a first interface at a receiver;
decrypting, at the receiver, a portion, but not all, of the received content prior to providing any of the received content to a device wirelessly coupled to the receiver;
detecting a wireless coupling of the device to a second interface at the receiver;
after decrypting at the receiver and after detecting the wireless coupling, but prior to providing any of the received content to the device, determining the device to be a non-compliant device; and
preventing further decryption of at least a portion of the content received through the first interface when the device is determined to be a non-compliant device, wherein the first and second interfaces are included within a same receiver,
wherein the content is one or more of audio files, image files, video or chat files, games, documents, texts or applications.

11. The method of claim 10, wherein:
at least the portion of the content is subject to a type of digital copyright protection; and
the device is determined to be non-compliant with the type of digital copyright protection.

12. The method of claim 10, wherein:
at least the portion of the content is in a high-definition video format; and
the device is determined to be non-compliant with the high-definition video format.

13. The method of claim 10, wherein said preventing includes:
preventing decryption of a second portion of the content after a first portion of the content is decrypted at the receiver and prior to any of the received content provided to the device, wherein the first portion of the content is decrypted before the device is determined to be a non-compliant device.

14. The method of claim 10, wherein the second interface is wirelessly coupled to the device over a wireless link.

15. The method of claim 10, further comprising:
converting at least the portion of the content to a non-compliant format after the device is determined to be said non-compliant device; and
producing at least the portion of the content through an output device in the non-compliant format.

16. The method of claim 10, further comprising:
converting at least the portion of the content to a non-compliant format after the device is determined to be said non-compliant device, and
sending at least the portion of the content through the second interface in the non-compliant format.

17. A device comprising:
first logic to receive a first signal of content to be received from a content provider through a first interface;
second logic to receive a second signal indicative of a wireless coupling of an external device to a second interface; and
third logic coupled between the first interface and the second interface, the third logic to decrypt a portion, but not all, of the received content prior to any of the received content provided to the external device, and to determine whether the external device is a non-compliant device after the decryption of the portion and after receipt of at least the second signal, the third logic further to prevent further decryption of at least a portion of the received content when the device is determined to be a non-compliant device and prior to any of the received content provided to the external device,
wherein the content is one or more of audio files, image files, video or chat files, games, documents, texts or applications.

18. The device of claim 17, wherein the first signal includes at least the portion of the content.

19. The device of claim 17, wherein the third logic executes a program to determine whether the external device is said non-compliant device or to prevent decryption of at least the portion of the content, or both.

20. The device of claim 17, wherein:
at least the portion of the content is subject to a type of digital copyright protection, and
the third logic is to determine the device to be non-compliant with the type of digital copyright protection.

21. The device of claim 17, wherein:
at least the portion of the content is in a high-definition video format, and
the third logic is to determine the device is non-compliant with the high definition video format.

22. The device of claim 17, wherein the third logic is to prevent decryption of a second portion of the content after a first portion of the content is decrypted and prior to any of the received content provided to the external device, and
wherein the first portion of the content is decrypted before the third logic is to determine that the external device is a non-compliant device.

23. A non-transitory computer-readable medium storing a program for controlling a receiver, the program comprising:
first code to determine that a device to be wirelessly coupled to the receiver is a non-compliant device;
second code to decrypt, at the receiver, a portion, but not all, of content received from a content provider through an interface of the receiver prior to any of the received content provided to the device, and to prevent further decryption of at least a portion of the content received through the interface when the device is determined to be a non-compliant device and prior to any of the received content provided to the device,
wherein the content is one or more of audio files, image files, video or chat files, games, documents, texts or applications.

24. The non-transitory computer-readable medium of claim 23, wherein at least the portion of the content is subject to a type of digital copyright protection.

25. The non-transitory computer-readable medium of claim 23, wherein at least the portion of the content is in a high-definition video format.

* * * * *